United States Patent [19]

Okumoto et al.

[11] Patent Number: 4,980,407

[45] Date of Patent: Dec. 25, 1990

[54] POLYAMIDE RESIN COMPOSITION

[75] Inventors: Tadaoki Okumoto; Koji Sasaki; Junji Koizumi; Koichi Sato, all of Aichi, Japan

[73] Assignee: Toyoda Gosei Co., Ltd., Nishikasugai, Japan

[21] Appl. No.: 424,614

[22] Filed: Oct. 20, 1989

[30] Foreign Application Priority Data

Oct. 21, 1988 [JP] Japan .................... 63-264022
Oct. 28, 1988 [JP] Japan .................... 63-270796

[51] Int. Cl.$^5$ ............................................. C08L 77/00
[52] U.S. Cl. ................................. 524/449; 524/538; 525/432
[58] Field of Search ............... 525/432; 524/449, 538

[56] References Cited

U.S. PATENT DOCUMENTS 4,098,860  7/1978  Etou et al. .................... 525/432

FOREIGN PATENT DOCUMENTS 53-120761 10/1978 Japan .
56-86950   7/1981 Japan .
61-36357   2/1986 Japan .

Primary Examiner—Ana L. Carrillo
Attorney, Agent, or Firm—Cushman, Darby & Cushman

[57] ABSTRACT

A polyamide resin composition is disclosed, comprising as main components, (a) 5 to 90% by weight of a nylon 6 resin, (b) 5 to 90% by weight of an aromatic diamine-based nylon resin, and (c) 5 to 90% by weight of a nylon 66 resin, based on the total amount of components (a), (b) and (c).

8 Claims, No Drawings

POLYAMIDE RESIN COMPOSITION

FIELD OF THE INVENTION

This invention relates to a polyamide resin composition suitable for use as a material for automobile parts, especially such parts employed around engines and required to have vibration-damping performances as cylinder head covers and gearcases.

BACKGROUND OF THE INVENTION

Nylon resin materials are superior to metal materials to obtain light-weight products, and also to obtain various excellent properties such as vibration-damping properties, rigidity, heat resistance, oil resistance and others. For these reason, nylon resins are recently used as molding materials in producing automobile parts, especially such parts employed around engines as cylinder head covers and gearcases, for the purpose of reducing automobile weights and engine noises.

In general, resin materials are superior to metal materials in vibration-damping performance. However, from the viewpoint of the effect for reducing noises, the substitution of resinous parts for metallic parts results in increase of air-borne sounds due to the small specific gravities of the resinous parts, although structure-borne sounds, i.e., sounds resulting from the vibrations of the parts themselves are reduced. Therefore, in order to effectively reduce noises by replacing metallic parts with resinous ones, the resinous parts should be able to reduce structure-borne sounds to such an extent that the resulting increase of air-borne sounds is more than counterbalanced by the reduction of structure-borne sounds. In other words, resinous parts are required to have extremely high vibration-damping performance.

In this respect, molded automobile parts of the above-mentioned kinds manufactured from conventional nylon resin materials are insufficient in vibration-damping performance, or even if they show relatively good vibration-damping properties at normal temperatures, their vibration-damping performance becomes insufficient in the practical temperature range, i.e., at temperatures as high as about 80° C. to 120° C. Thus, conventional nylon resin materials have such a technical problem to be solved.

In order to improve such insufficient ability to damp vibrations under the high-temperature use conditions, there has been proposed a resin composition comprising a polyamide resin and a tackifier resin as described in JP-A-61-36357 (The term "JP-A" as used herein means an "unexamined published Japanese patent application"). However, there are problems to be solved concerning the strength and rigidity of molded parts prepared by these resin composition.

Plastic materials generally possess highly viscoelastic properties, and their vibration-damping performance is most remarkable around temperatures at which the loss factors ($\eta$) of the mechanical dispersion mainly due to the glass transition of the polymer materials have maximal values. Such temperatures are usually 10° to 30° C. higher than the glass transition temperatures (Tg) measured by differential scanning calorimetry (DSC). For example, straight-chain aliphatic nylons such as nylon 6, nylon 66, nylon 12, nylon 11 and nylon 610 have the Tg of about 40° to 60° C., and their vibration-damping performance is maximal at about 60° to 80° C. Aromatic nylons, as another type of nylon resin, such as a crystalline m-xylylenediamine resin (MXD nylon) which has aromatic rings in its molecular chains, and a copolymer of one or more of diamines and one or more of dicarboxylic acids (e.g., terephthalic acid, isophthalic acid) which is a non-crystalline nylon, have the Tg of 120° C. or higher, with their vibration-damping performance being maximal at temperatures as high as 130° C. or higher.

SUMMARY OF THE INVENTION

The present inventors have conducted extensive studies to improve the vibration-damping properties and mechanical properties of polyamide resin materials. As a result, they have found that a polyamide resin composition suited for various applications can be obtained by blending specific kinds of polyamide resins in specific proportions.

Therefore, an object of the present invention is to provide a novel polyamide resin composition from which molded parts having extremely high mechanical strengths as well as improved vibration-damping performance can be obtained.

The foregoing and other objects, features and advantages of this invention will be apparent from the following detailed description and appended claims.

This invention relates to a provision of a novel polyamide resin composition comprising, as main components, (a) 5 to 90% by weight of a nylon 6 resin, (b) 5 to 90% by weight of an aromatic diamine-based nylon resin, and (c) 5 to 90% by weight of a nylon 66 resin, the content of each component being given based on the total amount of components (a), (b) and (c).

DETAILED DESCRIPTION OF THE INVENTION

The present invention will be explained below in detail.

The nylon 6 resin (a) used in the composition of this invention is a polyamide which contains at least 90 mol % of caprolactam units and may contain other monomer units such as $\omega$-laurolactam units. The molecular weight, or viscosity, of the nylon 6 resin is not especially limited. However, the molecular weight is preferably in such a range that the resulting composition can be molded under the normal molding conditions. That is, the nylon 6 resin may generally have a relative viscosity ($\eta_{rel}$) which is with the range of from 2.0 to 6.0. Although a relatively low viscosity is desirable from the viewpoint of obtaining a composition having a low melt viscosity, the relative viscosity ($\eta_{rel}$) of the nylon 6 resin is preferably in the range of from 2.3 to 4.0 since too low relative viscosities result in poor mechanical strengths of final molded articles. The term "relative viscosity" as used herein means a viscosity value measured at 25° C. on a polymer solution prepared by dissolving 1 g of a polymer in 100 ml of 98% concentrated sulfuric acid. The amount of the nylon 6 resin (a) incorporated in the composition is from 5 to 90% by weight and preferably from 50 to 90% by weight, based on the total amount of the polyamide resins, i.e., components (a), (b) and (c).

The above-mentioned aromatic diamine-based nylon resin (b) is a crystalline nylon resin, and is preferably a xylylenediamine-based nylon resin consisting of xylylenediamine units and aliphatic, straight-chain dibasic acid units. The xylylenediamine is m-xylylenediamine, p-xylylenediamine or a combination thereof. As examples of the aliphatic, straight-chain dibasic acid, there may be mentioned adipic acid, sebacic acid, suberic acid, azelaic acid and dodecanoic diacid.

Especially preferred as the nylon resin (b) is nylon MXD6 consisting mainly of m-xylylenediamine units and adipic acid salt units. The amount of the aromatic diamine-based nylon resin (b) incorporated in the composition is from 5 to 90% by weight and preferably from 5 to 40% by weight, based on the total amount of the polyamide resins, i.e., components (a), (b) and (c).

The above-mentioned nylon 66 resin (c) is a polyamide containing at least 90 mo; % of hexamethylene adipamide units and may contain other monomer units such as ω-laurolactam units. The molecular weight, or viscosity, of the nylon 66 resin is not especially limited. However, the molecular weight is preferably in such a range that the resulting composition can be molded under the normal molding conditions. That is, the nylon 66 resin (c) generally has a relative viscosity ($\eta_{rel}$) in the range of from 2.0 to 6.0 and preferably from 2.3 to 4.0, as in the case of the nylon 6 resin (a). The amount of the nylon 66 resin (c) incorporated in the composition is from 5 to 90% by weight and preferably from 50 to 90% by weight, based on the total amount of the polyamide resins, i.e., components (a), (b) and (c).

An inorganic filler (component (d)) is preferably incorporated in the composition of this invention comprising the above-described components (a), (b) and (c), in order that the composition may be suited for use as a material of the automobile parts such as a cylinder head cover and a gear cover which are employed around engines and required to have high rigidity and heat resistance as well as vibration-damping performance.

Examples of the inorganic filler (d) include glass fibers, mica, talc, wollastonite, barium sulfate, clay, calcium carbonate, carbon fibers, silicon carbide fibers, potassium titanate whiskers and calcium sulfate whiskers. Of these, glass fibers or a combination of glass fibers and mica is most suited for use in the resin composition of this invention because they show extremely good reinforcing effects.

As the glass fibers incorporated in the composition, there may be employed glass fibers for use in manufacture of ordinary glass fiber-reinforced resins and their sizes and shapes are not particularly limited. Specifically, there may be employed long fibers such as glass rovings, short fibers such as chopped strands and milled fibers, and glass fibers of any other shapes and sizes. Especially preferred are glass fibers which have been surface-treated with a silane coupling agent, a titanate coupling agent or the like. The amount of the inorganic filler (d) incorporated in the composition of this invention is preferably from 10 to 50 parts by weight and more preferably from 25 to 45 parts by weight, per 100 parts by weight of the total amount of the above-described components (a), (b) and (c).

The resin composition of this invention can be obtained according to ordinary methods. For example, predetermined proportions of the above-described resin components (a), (b) and (c), each in the form of pellets or powder, are mixed with each other by means of a tumbling blender, a Henschel mixer, a ribbon mixer or the like, and then the resulting mixture is melt-kneaded, preferably together with the above-described inorganic filler (d), by means of an ordinarily employed kneading machine such as a single-screw extruder(one-rod roll extruder), a twin-screw extruder(two-rod roll extruder), a kneader, a Banbury mixer or the like, to obtain a composition of this invention. In the case where an extruder is employed, one or two of the resin components (a), (b) an (c) may be fed during mixing in the form of pellets or a powder or in a melt form. Other various modifications may be employed for preparing the composition.

Various additives or the like may be incorporated in the composition of this invention as long as the additive used does not impair the moldability and physical properties of the resulting product. For example, an antioxidant, an ultraviolet absorber, a lubricant, an antistatic agent, a nucleator, a mold-release agent, a plasticizer, a pigment, a flame retarder, an extender, an inorganic filler, a fibrous reinforcing material, other resin materials, etc. may be incorporated.

The resin composition according to the present invention gives molded articles having high vibration-damping performance and excellent mechanical properties and, therefore, it can be advantageously used as a material for automobile parts and electrical and mechanical parts. The composition is especially suitable for automobile parts, such as a cylinder head cover, a gear cover and an oil pan, which are employed in the place where noises are generated by vibration, such as engine rooms.

The resin composition according to this invention will now be illustrated in more detail with reference to the following Examples and Comparative Examples, but the Examples should not be construed to be limiting the scope of the invention.

EXAMPLE I AND COMPARATIVE EXAMPLE I

With respect to each of Examples I-1 to I-17 and Comparative Examples I-1 to I-16, the components as shown in Table I were mixed for 5 minutes by means of a tumbling blender, and the resulting mixture was melt-kneaded with a twin-screw extruder (L/D=27 and 30 mm; rotating in opposite directions) and then pelletized. The thus-obtained pellets were dried at 100° C. for 5 hours and then formed into test pieces by melt pressing. The test pieces were annealed under vacuum at 100° C. for 8 hours before measurements of vibration-damping properties and mechanical properties were carried out.

Loss Factor (which is a measure of vibration-damping performance [see *Soon Shindo Taisaku Handbook* edited by Japan Onkyo Zairyo Kyokai and published by Gihodo, Japan (1982)]

Test piece: 150 mm × 150 mm, 3 mm in thickness

Measuring method: In a constant-temperature bath, the center of a sample was allowed to vibrate at 0.1 G and the transfer function was measured. Then, a loss factor $\eta$ was calculated from the secondary resonance point by the half value width method.

Tensile Strength and Elongation at Break

Test piece: JIS Type 3 dumbbell of 0.5 mm in thickness

Measuring conditions: crosshead speed 50 mm/min, ambient temperature 23°±3° C., gauge length 20 mm.

The results obtained are shown in Table I.

TABLE I

| | Comp. Ex. | Comp. Ex. | Comp. Ex. | Comp. Ex. | Comp. Ex. | Comp. Ex. |

TABLE I-continued

| Composition* | I-1 | I-2 | I-3 | I-4 | I-5 | I-6 |
|---|---|---|---|---|---|---|
| Nylon 6 | 100 | 80 | 60 | 40 | 20 | — |
| Aromatic diamine-based nylon | — | 20 | 40 | 60 | 80 | 100 |
| Nylon 66 | | | | | | |
| Loss factor η (80° C.) | 0.129 | 0.135 | 0.131 | 0.088 | 0.040 | 0.011 |
| Loss factor η (100° C.) | 0.084 | 0.123 | 0.186 | 0.225 | 0.231 | 0.070 |
| Tensile strength (kg/cm²) | 700 | 880 | 950 | 1050 | 1160 | 1350 |
| Elongation at break (%) | 200 | 50 | less than 5 | less than 5 | less than 5 | less than 5 |

| Composition* | Example I-1 | Example I-2 | Example I-3 | Example I-4 | Example I-5 | Comp. Ex. I-7 | Example I-6 | Example I-7 |
|---|---|---|---|---|---|---|---|---|
| Nylon 6 | 80 | 60 | 40 | 20 | 10 | 80 | 70 | 60 |
| Aromatic diamine-based nylon | 10 | 30 | 50 | 70 | 80 | — | 10 | 20 |
| Nylon 66 | 10 | 10 | 10 | 10 | 10 | 20 | 20 | 20 |
| Loss factor η (80° C.) | 0.157 | 0.162 | 0.120 | 0.075 | 0.058 | 0.143 | 0.166 | 0.188 |
| Loss factor η (100° C.) | 0.115 | 0.168 | 0.204 | 0.219 | 0.178 | 0.104 | 0.125 | 0.142 |
| Tensile strength (kg/cm²) | 800 | 880 | 960 | 1080 | 1190 | 740 | 780 | 820 |
| Elongation at break (%) | 100 | 70 | 10 | 10 | 10 | 170 | 160 | 150 |

| Composition* | Example I-8 | Example I-9 | Comp. Ex. I-8 | Comp. Ex. I-9 | Example I-10 | Example I-11 | Example I-12 |
|---|---|---|---|---|---|---|---|
| Nylon 6 | 40 | 20 | — | 60 | 50 | 40 | 20 |
| Aromatic diamine-based nylon | 40 | 60 | 80 | — | 10 | 20 | 40 |
| Nylon 66 | 20 | 20 | 20 | 40 | 40 | 40 | 40 |
| Loss factor η (80° C.) | 0.157 | 0.097 | 0.040 | 0.141 | 0.155 | 0.167 | 0.124 |
| Loss factor η (100° C.) | 0.186 | 0.204 | 0.131 | 0.106 | 0.130 | 0.152 | 0.172 |
| Tensile strength (kg/cm²) | 900 | 990 | 1260 | 770 | 810 | 840 | 930 |
| Elongation at break (%) | 50 | 10 | less than 5 | 140 | 100 | 70 | 20 |

| Composition* | Example I-13 | Comp. Ex. I-10 | Comp. Ex. I-11 | Example I-14 | Example I-15 | Example I-16 | Comp. Ex. I-12 | Comp. Ex. I-13 |
|---|---|---|---|---|---|---|---|---|
| Nylon 6 | 10 | — | 40 | 30 | 20 | 10 | — | 20 |
| Aromatic diamine-based nylon | 50 | 60 | — | 10 | 20 | 30 | 40 | — |
| Nylon 66 | 40 | 40 | 60 | 60 | 60 | 60 | 60 | 80 |
| Loss factor η (80° C.) | 0.095 | 0.063 | 0.139 | 0.151 | 0.152 | 0.130 | 0.086 | 0.118 |
| Loss factor η (100° C.) | 0.176 | 0.181 | 0.109 | 0.132 | 0.155 | 0.166 | 0.176 | 0.105 |
| Tensile strength (kg/cm²) | 1010 | 1090 | 780 | 830 | 880 | 910 | 1020 | 840 |
| Elongation at break (%) | 10 | less than 5 | 170 | 150 | 100 | 30 | less than 5 | 100 |

| Composition* | Example I-17 | Comp. Ex. I-14 | Comp. Ex. I-15 | Composition* [Prior Art] | Comp. Ex. I-16 |
|---|---|---|---|---|---|
| Nylon 6 | 10 | — | — | Nylon 6 | 70 |
| Aromatic diamine-based nylon | 10 | 20 | — | Polyamide elastomer | 18 |
| Nylon 66 | 80 | 80 | 100 | Coumaroneindene resin | 12 |
| Loss factor η (80° C.) | 0.125 | 0.117 | 0.120 | Loss factor η (80° C.) | 0.155 |
| Loss factor η (100° C.) | 0.152 | 0.141 | 0.123 | Loss factor η (100° C.) | 0.142 |
| Tensile strength (kg/cm²) | 900 | 970 | 890 | Tensile strength (kg/cm²) | 450 |
| Elongation at break (%) | 60 | 35 | 120 | Elongation at break (%) | 30 |

(*Note)
Nylon 6: Gilon A28 (manufactured by EMS Company, Swizerland). Aromatic diamine-based nylon: T-600 (manufactured by Toyobo Co., Ltd., Japan).
Nylon 66: Grilon T-300GM (manufactured by EMS Company, Switzerland). Comparative Example I-16: Refer to JP-A-61-36357.

It is clearly seen from the above results that the molded products prepared from the polyamide resin compositions of Example I according to this invention show excellent vibration-damping performance, especially at temperatures as high as 80° to 100° C., as well as extremely high mechanical strengths.

EXAMPLE II AND COMPARATIVE EXAMPLE II

With respect to each of the Examples II-1 to II-11 and Comparative Examples II-1 to II-9, the resin components except for inorganic filler components as shown in Table II were mixed for 5 minutes by means of a tumbling blender. The thus obtained mixture and the inorganic filer were separately fed to a twin-screw extruder (L/D=27, 30 mm; rotating in opposite directions) such that the mixture was introduced into the lowest part, i.e., the end, of the screws and the inorganic filler was introduced into the midle of the screws. The thus fed resin mixture and filler were melt-kneaded and then pelletized. The pellets obtained were dried in a hot air of 100° C. for 8 hours, and then formed into test pieces of predetermined shapes and sizes by injection molding. These test pieces were annealed under vacuum at 100° C. for 8 hours before measurements of vibration-damping properties and mechanical properties were carried out.

Dissipation Factor

Measurements were made according to the same method as in Example I and Comparative Example I.

Flexural Modulus of elasticity

In accordance with ASTM D790.

Izod Impact Strength (with notch)

In accordance with ASTM D256.

Heat Distortion Temperature

In accordance with ASTM D648 (18.6 kg/cm² load). The results obtained are shown in Table II.

compositions of Example II according to this invention show excellent vibration-damping performance, especially at temperatures as high as 80° to 100° C., as well as extremely high mechanical strengths and heat resistance.

While the invention has been described in detail and with reference to specific embodiments thereof, it will be apparent to one skilled in the art that various changes and modifications can be made therein without departing from the spirit and scope thereof.

What is claimed is:

1. A polyamide resin composition comprising having improved vibration-damping properties, as main components,
   (a) 5 to 90% by weight of a nylon 6 resin,
   (b) 5 to 90% by weight of an aromatic diamine-based nylon resin, and

TABLE II

| Composition* | Comp. Ex. II-1 | Comp. Ex. II-2 | Comp. Ex. II-3 | Comp. Ex. II-4 | Comp. Ex. II-5 | Comp. Ex. II-6 |
|---|---|---|---|---|---|---|
| Nylon 6 resin | 100 | 60 | 20 | — | — | — |
| Xylylenediamine-based nylon resin | — | 40 | 80 | 100 | 60 | 20 |
| Nylon 66 resin | — | — | — | — | 40 | 80 |
| Glass fiber | 43 | 43 | 43 | 43 | 43 | 43 |
| Mica | — | — | — | — | — | — |
| Loss factor $\eta$ (80° C.) | 0.069 | 0.068 | 0.021 | 0.006 | 0.034 | 0.062 |
| Loss factor $\eta$ (100° C.) | 0.041 | 0.095 | 0.120 | 0.036 | 0.093 | 0.073 |
| Flexural modulus of elasticity (kg/cm²) | 80000 | 93000 | 105000 | 110000 | 100000 | 90000 |
| Izod impact strength (kg · cm/cm) | 12 | 3 | 4 | 8 | 4 | 8 |
| Heat distortion temperature (°C.) | 208 | 213 | 218 | 225 | 235 | 246 |

| Composition* | Comp. Ex. II-7 | Comp. Ex. II-8 | Comp. Ex. II-9 | Example II-1 | Example II-2 | Example II-3 | Example II-4 | Example II-5 |
|---|---|---|---|---|---|---|---|---|
| Nylon 6 resin | — | 40 | 20 | 80 | 10 | 10 | 60 | 60 |
| Xylylenediamine-based nylon resin | — | — | — | 10 | 80 | 10 | 20 | 20 |
| Nylon 66 resin | 100 | 60 | 80 | 10 | 10 | 80 | 20 | 20 |
| Glass fiber | 43 | 43 | 43 | 43 | 43 | 43 | 25 | 43 |
| Mica | — | — | — | — | — | — | — | — |
| Loss factor $\eta$ (80° C.) | 0.066 | 0.072 | 0.071 | 0.082 | 0.033 | 0.069 | 0.110 | 0.102 |
| Loss factor $\eta$ (100° C.) | 0.058 | 0.057 | 0.054 | 0.063 | 0.095 | 0.081 | 0.087 | 0.078 |
| Flexural modulus of elasticity (kg/cm²) | 86000 | 84000 | 82000 | 83000 | 105000 | 86000 | 64000 | 85000 |
| Izod impact strength (kg · cm/cm) | 10 | 9 | 10 | 10 | 8 | 9 | 7 | 10 |
| Heat distortion temperature (°C.) | 253 | 236 | 214 | 207 | 221 | 241 | 192 | 210 |

| Composition* | Example II-6 | Example II-7 | Example II-8 | Example II-9 | Example II-10 | Example II-11 |
|---|---|---|---|---|---|---|
| Nylon 6 resin | 60 | 60 | 60 | 20 | 20 | 40 |
| Xylylenediamine-based nylon resin | 20 | 20 | 20 | 60 | 20 | 30 |
| Nylon 66 resin | 20 | 20 | 20 | 20 | 60 | 30 |
| Glass fiber | 67 | 100 | 33.5 | 43 | 43 | 43 |
| Mica | — | — | 33.5 | — | — | — |
| Loss factor $\eta$ (80° C.) | 0.097 | 0.092 | 0.120 | 0.054 | 0.083 | 0.089 |
| Loss factor $\eta$ (100° C.) | 0.074 | 0.070 | 0.096 | 0.106 | 0.084 | 0.090 |
| Flexural modulus of elasticity (kg/cm²) | 116000 | 145000 | 110000 | 102000 | 88000 | 93000 |
| Izod impact strength (kg · cm/cm) | 13 | 15 | 8 | 9 | 9 | 9 |
| Heat distortion temperature (°C.) | 211 | 211 | 207 | 220 | 235 | 218 |

(*Note)
Nylon 6 resin: Grilon A28 (manufactured by EMS Company, Swizerland) Xylylenediamine-based nylon resin: T-600 (manufactured by Toyobo Co., Ltd., Japan)
Nylon 66 resin: Grilon T-300GM (manufactured by EMS Company, Switzerland) Glass fiber: CS 03 MA FT-2 (manufactured by Asahi Fiber Glass Co., Ltd., Japan)
Mica: S-325 (manufactured by Repco Ltd.)

It is clearly seen from the above results that the molded products prepared from the polyamide resin (c) 5 to 90% by weight of a nylon 66 resin, based on the total amount of components (a), (b) and (c).

2. The polyamide resin composition as claimed in claim 1, wherein said aromatic diamine-based nylon resin is a xylylenediamine-based nylon resin.

3. The polyamide resin composition as claimed in claim 1, which further comprises 10 to 50 parts by weight of an inorganic filler per 100 parts by weight of the total of said components (a), (b) and (c).

4. The polyamide resin composition as claimed in claim 1, wherein said nylon 6 resin is contained in an amount of 50 to 90% by weight based on the total amount of components (a), (b) and (c).

5. The polyamide resin composition as claimed in claim 1, wherein said aromatic diamine-based nylon resin is contained in an amount of 5 to 40% by weight based on the total amount of components (a), (b) and (c).

6. The polyamide resin composition as claimed in claim 1, wherein said nylon 66 resin is contained in an amount of 50 to 90% by weight based on the total amount of components (a), (b) and (c).

7. The polyamide resin composition as claimed in claim 3, wherein said inorganic filler is contained in an amount of 25 to 45 parts by weight per 100 parts by weight of the total amount of said components (a), (b) and (c).

8. The polyamide resin composition as claimed in claim 3, wherein said inorganic filler is glass fibers or a combination of glass fibers and mica.

* * * * *